United States Patent
Verner et al.

(10) Patent No.: US 11,642,720 B2
(45) Date of Patent: May 9, 2023

(54) INTEGRAL CORE BUMPERS

(71) Applicant: UNITED TECHNOLOGIES CORPORATION, Farmington, CT (US)

(72) Inventors: Carl R. Verner, Windsor, CT (US); David A. Krause, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/654,902

(22) Filed: Oct. 16, 2019

(65) Prior Publication Data

US 2021/0114085 A1    Apr. 22, 2021

(51) Int. Cl.
   *B22C 9/10*       (2006.01)
   *B22C 21/14*      (2006.01)

(52) U.S. Cl.
   CPC ............... *B22C 9/10* (2013.01); *B22C 9/108* (2013.01); *B22C 21/14* (2013.01)

(58) Field of Classification Search
   CPC .......... B22C 9/10; B22C 9/103; B22C 9/108; B22C 21/14
   USPC ................. 164/397–400, 369–370
   See application file for complete search history.

(56) References Cited

U.S. PATENT DOCUMENTS

| | | | |
|---|---|---|---|
| 6,578,623 B2 | 6/2003 | Keller et al. | |
| 7,036,556 B2 | 5/2006 | Caputo et al. | |
| 7,610,946 B2 | 11/2009 | Morris et al. | |
| 8,096,343 B2 | 1/2012 | Whitton | |
| 2004/0094287 A1* | 5/2004 | Wang | B22C 21/14 164/361 |
| 2007/0221359 A1* | 9/2007 | Reilly | B22C 9/103 164/369 |
| 2008/0006384 A1* | 1/2008 | Memmen | B22C 9/04 164/45 |
| 2008/0164001 A1 | 7/2008 | Morris et al. | |
| 2009/0000754 A1* | 1/2009 | Piggush | B22C 9/103 164/15 |
| 2012/0168108 A1* | 7/2012 | Farris | B22C 9/103 164/15 |
| 2013/0333855 A1* | 12/2013 | Merrill | B22C 9/02 164/45 |
| 2014/0072447 A1 | 3/2014 | Propheter-Hinckley | |
| 2018/0161851 A1* | 6/2018 | Propheter-Hinckley | B22C 21/14 |

FOREIGN PATENT DOCUMENTS

EP    2913121    9/2015

OTHER PUBLICATIONS

European Patent Office, European Search Report dated Nov. 18, 2020 in Application No. 20200910.6.
European Patent Office, European Search Report dated Oct. 17, 2022 in Application No. 22182693.6.

* cited by examiner

*Primary Examiner* — Kevin E Yoon
*Assistant Examiner* — Jacky Yuen
(74) *Attorney, Agent, or Firm* — Snell & Wilmer L.L.P.

(57) ABSTRACT

A casting core assembly is disclosed herein. The casting core assembly comprises a casting core and a bumper assembly. The bumper assembly is disposed on an outer surface of the casting core. The bumper assembly comprises a receptacle and a metal apparatus. The metal apparatus may be a pin, a sphere, or the like.

5 Claims, 9 Drawing Sheets

INTEGRAL CORE BUMPERS

FIELD

The present disclosure relates to airfoils for gas turbine engines, and in particular, to ceramic cores having integral bumpers.

BACKGROUND

In gas turbine engines, airfoils, such as rotor blades and stator vanes may include internal cavities in which cooling air is introduced to convectively cool the airfoil. Internal cavities may be formed by a ceramic core during the manufacturing process for airfoils. Bumpers can be added to ceramic cores to keep the ceramic core centered in a casting during manufacturing.

SUMMARY

A casting core assembly is disclosed herein. The casting core assembly may comprise: a casting core having an outer surface; a bumper disposed on the outer surface, the bumper comprising a receptacle; and a metal apparatus partially disposed in the receptacle of the bumper, a portion of the metal apparatus extending outward from the bumper.

In various embodiments, the metal apparatus is a pin. The pin may comprise a proximal end and a distal end disposed opposite the proximal end, and wherein the proximal end is disposed at a depth below the outer surface of the casting core. The metal apparatus may be a sphere. The bumper may be integral to the casting core. The metal apparatus may be coupled to the bumper by at least one of an adhesive or a mechanical lock. The metal apparatus may be configured to merge into an airfoil casting.

A method of manufacturing a casting assembly is disclosed herein. The method may comprise: forming a casting core having an outer surface; inserting a pin into the outer surface of the casting core; injecting ceramic composite around the pin; and heating the casting core, the injected ceramic composite and the pin.

In various embodiments, heating the casting core may further comprise forming a casting core assembly including a bumper assembly. The method may further comprise: injecting a wax around the casting core and the bumper assembly. The wax may enclose the bumper assembly. The method may further comprise forming an external shell around the wax. The forming the external shell may further comprise dipping the wax into a ceramic matrix slurry. The method may further comprise heating the casting assembly and removing the wax from the casting assembly.

A method of manufacturing a casting assembly is disclosed herein. The method may comprise: forming a casting core having a bumper disposed on an outer surface of the casting core, the bumper comprising a receptacle; inserting a metal apparatus into the receptacle of the bumper; and coupling the metal apparatus to the bumper.

In various embodiments, the coupling the metal apparatus is via at least one of a mechanical lock and an adhesive. The method may further comprise injecting wax around the casting core, the bumper, and the metal apparatus. The method may further comprise forming an external shell around the injected wax. The method may further comprise heating the casting assembly. The metal apparatus may be selected from a group consisting of a pin and a sphere.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
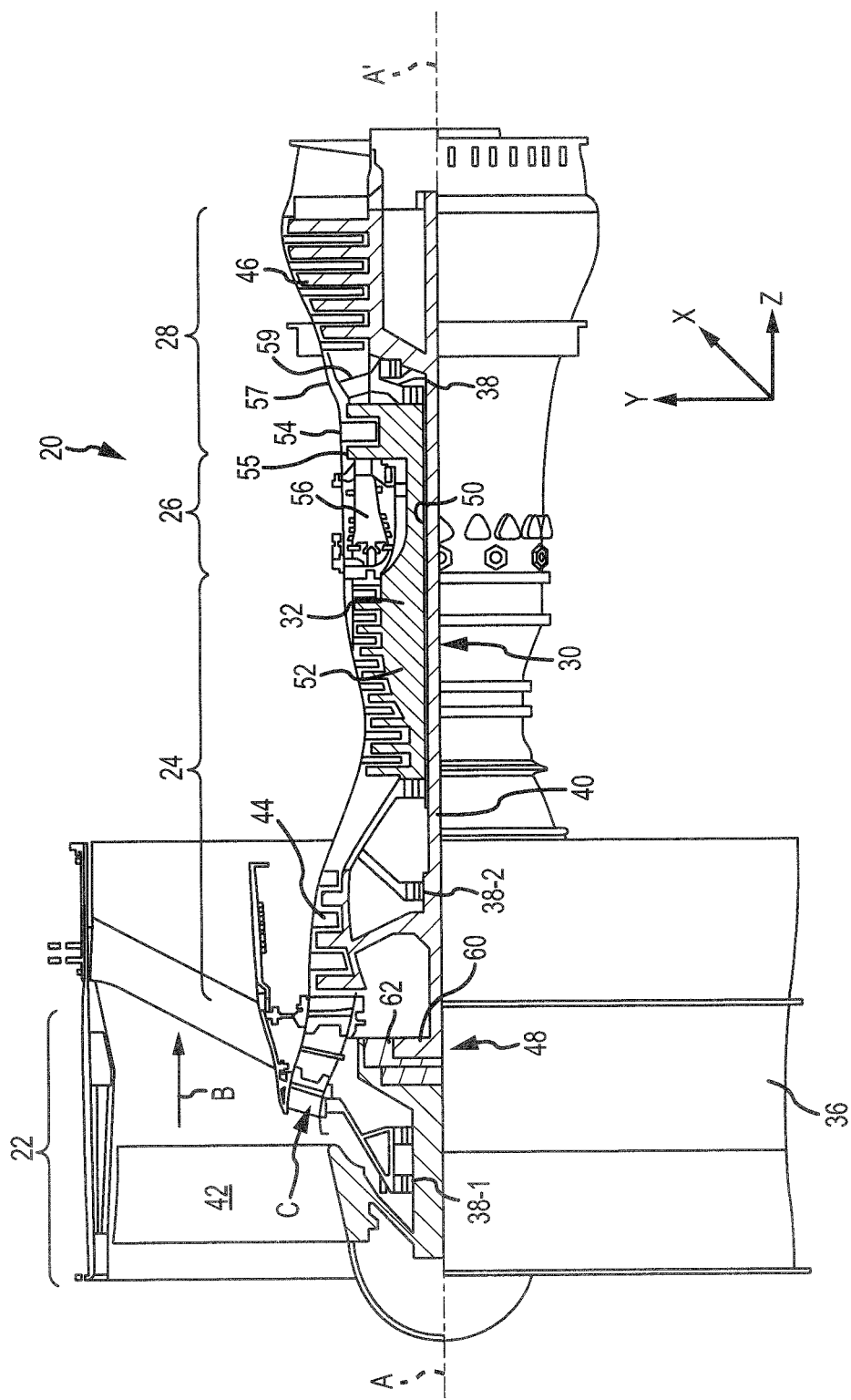
FIG. 1 illustrates an exemplary gas turbine engine, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Any reference related to fluidic coupling to serve as a conduit for cooling airflow and the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. A first component that is "radially outward" of a second component means that the first component is positioned at a greater distance away from the engine central longitudinal axis than the second component. As used herein, "distal" refers to the direction outward, or generally, away from a reference component. As used herein, "proximal" refers to a direction inward, or generally, towards the reference component.

The next generation turbofan engines are designed for higher efficiency and use higher pressure ratios and higher temperatures in the high pressure compressor than are conventionally experienced. These higher operating temperatures and pressure ratios create operating environments that cause thermal loads that are higher than the thermal loads conventionally experienced, which may shorten the operational life of current components.

The present disclosure relates to casting core assemblies. Casting core assemblies may comprise a casting core and a bumper assembly. The bumper assembly may comprise a bumper and a metal apparatus. The bumper extends from an outer surface of the casting core and may be integral to the casting core. The bumper may comprise a receptacle. The metal apparatus may be disposed within the receptacle of the bumper. The metal apparatus may be coupled to the bumper while the casting core is being formed or the casting core assembly may be formed and the metal apparatus may be coupled to the receptacle via an adhesive or a mechanical lock. The casting core assembly may eliminate the hand work of inserting a metal apparatus into wax patterns and blending them off post cast. The bumper assembly may allow repeatable positioning of an airfoil because it's a component of the casting core assembly. The bumper assembly may eliminate holes produced through an airfoil and/or between ribs during casting.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. In operation, fan section 22 can drive coolant (e.g., air) along a bypass-flow path B while compressor section 24 can drive coolant along a core-flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'.

A combustor 56 may be located between high-pressure compressor 52 and high-pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Airfoil 55 may be an internally cooled component of gas turbine engine 20. Trip strips may be located in internal cooling cavities of internally cooled engine parts. Internally cooled engine parts may be discussed in the present disclosure in terms of airfoils. However, the present disclosure applies to any internally cooled engine component (e.g., blade outer air seals, airfoil platforms, combustor liners, blades, vanes, or any other internally cooled component in a gas turbine engine).

Figure 2:
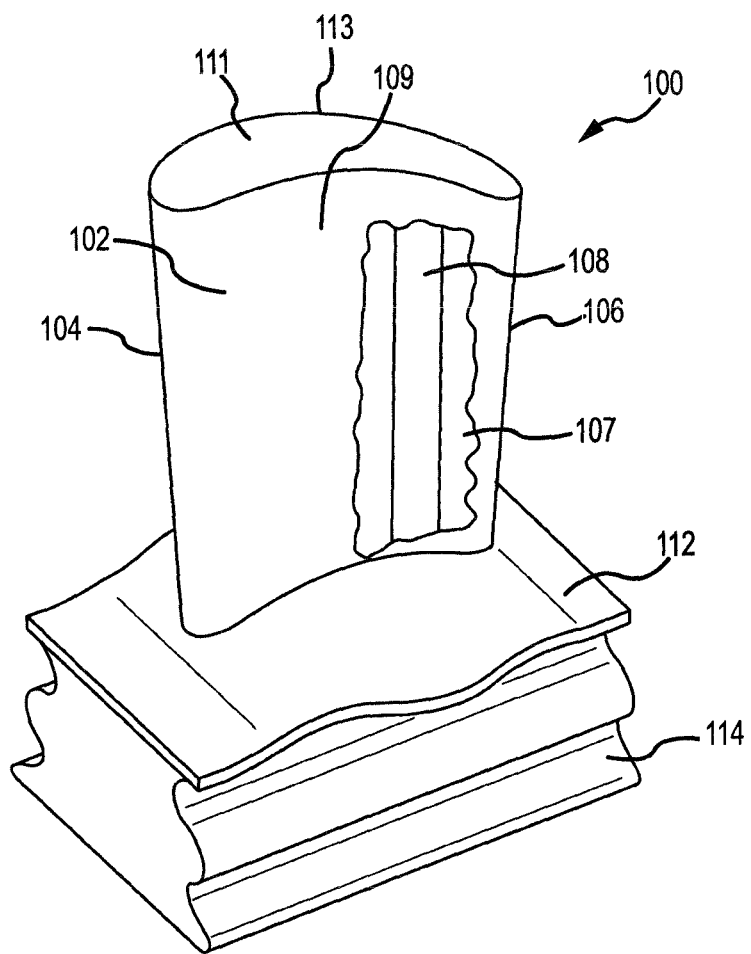
FIG. 2 illustrates an exemplary air foil having an internal cooling passage, in accordance with various embodiments.

With reference to FIG. 2, an airfoil 100 is shown with cooling passage 108, in accordance with various embodiments. Although an airfoil is shown, the present disclosure applies to any internally cooled part (e.g., blade outer air seals, airfoil platforms, combustor components, etc.). Airfoil 100 has a pressure side 102, a leading edge 104, and a trailing edge 106. Airfoil 100 also includes top 111 and suction side 113. Pressure side 102 surface is partially cutaway to illustrate cooling passages 108 defined be internal walls of airfoil 100. Hot air flowing through a gas turbine engine may first contact leading edge 104, flow along pressure side 109 and/or suction side 113 and leave airfoil at trailing edge 106.

In various embodiments, material 107 may define internal passages such as cooling passage 108. Cooling passage 108 is oriented generally in a direction from platform 112 and attachment 114 towards top 111 (i.e., a radial direction when airfoil 100 is installed in a turbine). Airfoil 100 may contain multiple cooling passages or chambers similar to cooling passage 108 oriented in various directions with varying hydraulic diameters. The internal cooling passages may be interconnected. Multiple cooling features may appear in the internal cooling passages, as illustrated in further detail below.

Figure 3:
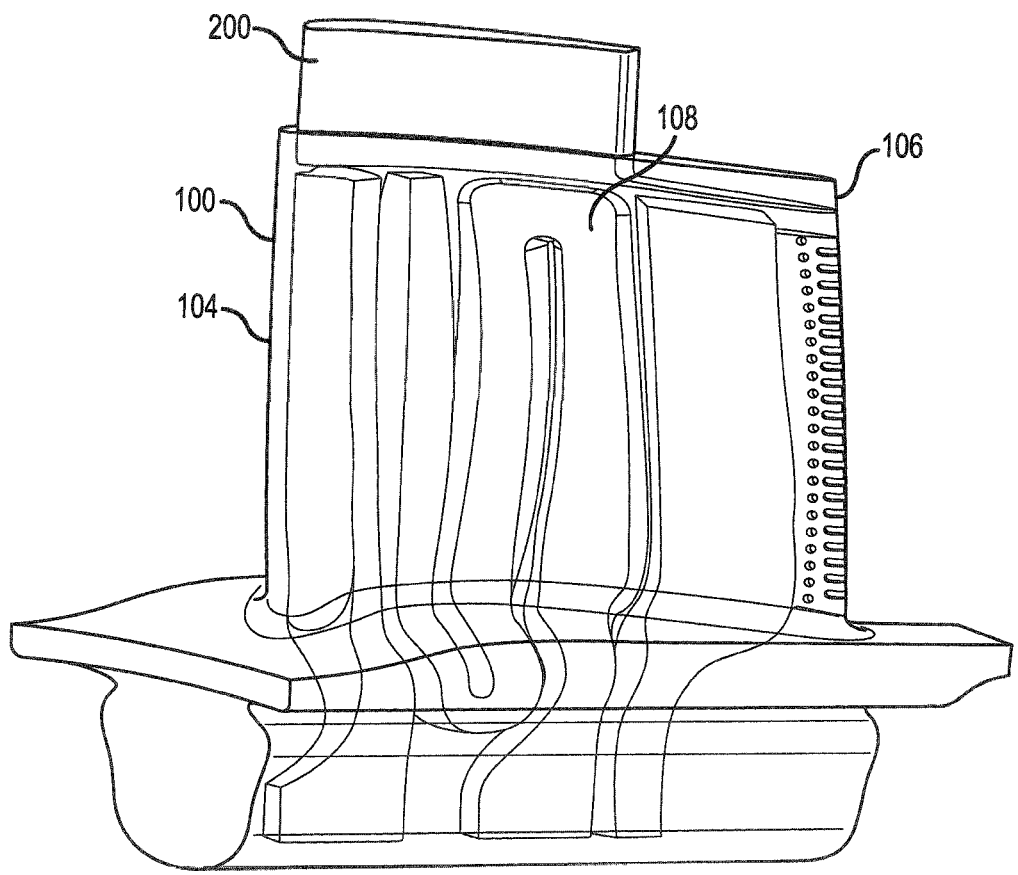
FIG. 3 illustrates a cast core for casting an airfoil, in accordance with various embodiments.

With reference to FIG. 3, a cast core 200, in accordance with various embodiments, is illustrated. Cast core 200 may be used in casting airfoil 100 to define internal features. Cast core 200 may define features aft of leading edge 104 and up to trailing edge 106 in airfoil 100. Cast core 200 may extend beyond trailing edge 106 of airfoil 100 during the casting process to define aft cooling openings. Cast core 200 may define cooling passage 108 of airfoil 100 and cooling features therein. In that regard, both airfoil 100 and cast core 200 may have the cooling passages and cooling features described herein.

The features of cast core 200 may be negatives of the cooling features described below with respect to an airfoil 100. Stated another way, cavities, openings, passages, and the like of airfoil 100 may be defined by material in cast core 200. Cooling features and pedestals of airfoil 100 that are defined by material in airfoil 100 as described herein may be formed as passages and openings in cast core 200. Thus, the features described below as bumpers and cooling passages may describe the structure of an airfoil 100 and/or a cast core 200.

Cast core 200 may be placed in a mold, and the material to form a component (e.g., airfoil 100) may be deposited in the mold. Cast core 200 may be removed from the component, leaving cavities and the desired cooling features in the component. Airfoil 100 (as well as other components using fluid turbulation) may be made from an austenitic nickel-chromium-based alloy such as that sold under the trademark Inconel® which is available from Special Metals Corporation of New Hartford, N.Y., USA, or other materials capable of withstanding exhaust temperatures.

Figure 4:
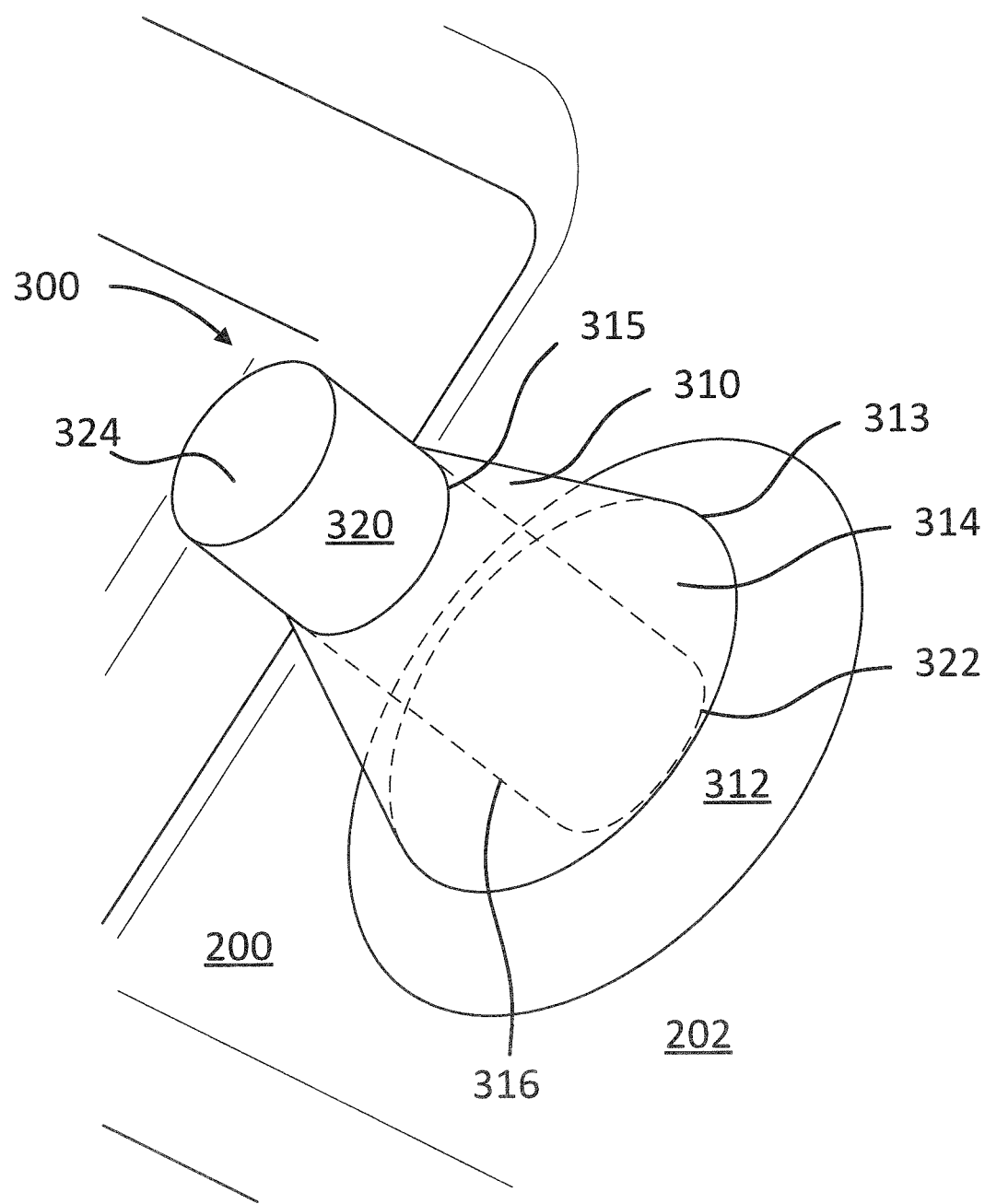
FIG. 4 illustrates a cast core including a bumper assembly, in accordance with various embodiments.

With reference to FIG. 4, a cast core 200 including a bumper assembly 300, in accordance with various embodiments, is illustrated. Cast core 200 comprises an outer surface 202 and a bumper assembly 300 extending outward from outer surface 202. In various embodiments, bumper assembly 300 is integral to the cast core 200. Bumper assembly 300 comprises a bumper 310 and a pin 320. The pin 320 may be disposed partially within the bumper 310.

In various embodiments, the bumper 310 comprises a fillet 312 coupling a proximal edge 313 of bumper 310 to the outer surface 202 of the cast core 200. The fillet 312 may reduce stress concentrations during the casting process. In various embodiments, bumper 310 is a truncated cone 314 extending from proximal edge 313 to distal edge 315. The bumper 310 further comprises a receptacle 316 extending from distal edge 315 into the cast core 200. Receptacle 316 may be a recess and may comprise a cylindrical shape. In various embodiments, the receptacle 316 may have a depth past outer surface 202 of the cast core 200. In various embodiments, the bumper 310 is integral to the cast core 200. The bumper may be made from ceramic composite, or any other material known in the art. Similarly, the cast core may be made from ceramic composite, or any other material known in the art.

The pin 320 may comprise a proximal end 322 and a distal end 324. In various embodiments, proximal end 322 is disposed within, and surrounded by, receptacle 316 of bumper 310. In various embodiments, distal end 324 of pin 320 may be at a first height measured perpendicular to outer surface 202 of the cast core 200 that is greater than a second height of the bumper 310. In various embodiments, pin 320 is made from any metal alloy known in the art, such as platinum, or the like. In various embodiments, pin 320 is cylindrical in shape.

In various embodiments, pin 320 may be coupled to bumper 310 by inserting the pin 320 into cast core 200 to a depth below outer surface 202. Next, bumper 310 may be injected partially around the pin 320 to form receptacle 316 and capture the pin 320 within bumper 310. The bumper 310 may then be hardened with the cast core 200 to couple the pin 320 and the bumper 310 to the cast core 200. In various embodiments, bumper 310 may be integral to cast core 200. The bumper 310 may comprise the receptacle 316. The pin 320 may be inserted into the receptacle 316 and coupled via an adhesive or a mechanical lock. By integrating the pin 320 into the cast core 200, the manual process of inserting a pin into a wax pattern and blending the pin 320 off post casting may be eliminated.

Figure 5A:
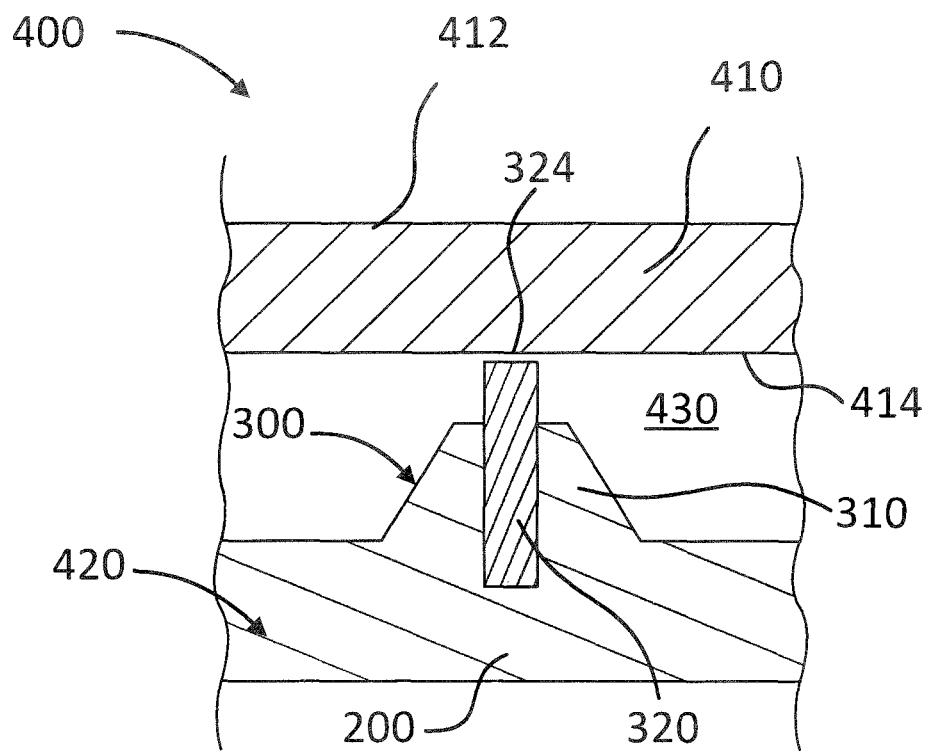
FIG. 5A illustrates a cross-sectional view of a casting assembly prior to casting, in accordance with various embodiments.

With reference to FIG. 5A, a cross-sectional view of a casting assembly 400 prior to casting, in accordance with various embodiments, is illustrated. In various embodiments, the casting assembly 400 comprises an external shell 410, a core assembly 420, and wax 430 disposed between the core assembly 420 and the external shell 410. In various embodiments, external shell 410 comprises an outer surface 412 and an inner surface 414 disposed opposite the outer surface. In various embodiments, casting assembly 400 comprises a cast core 200 and a bumper assembly 300. In various embodiments, distal end 324 of pin 320 is disposed between 0.000 inches and 0.006 inches (0.000 cm and 0.015 cm) from inner surface 414 of external shell 410, or between 0.002 inches and 0.006 inches (0.005 cm and 0.015 cm), or between 0.003 inches and 0.005 inches (0.008 cm and 0.013 cm). In various embodiments, distal end 324 of pin 320 contacts inner surface 414 of external shell 410.

In various embodiments, the external shell 410 is made of ceramic composite, or any other material known in the art. In various embodiments, the core assembly 420 is manufactured. Then, the core assembly 420 is placed into a wax die. Wax 430 is then injected around the core assembly 420. The external pattern of airfoil 100 is produced by the injected wax 430. The mold assembly comprising the core assembly 420 and the wax 430 is then placed on a tree assembly. The tree assembly is then dipped into ceramic to make external shell 410 outside of the wax 430 and resulting in casting assembly 400. Next, the casting assembly 400 is heated and the wax 430 is melted and removed from the casting assembly 400 resulting in casting assembly 401, as shown in FIG. 5B.

Figure 5B:
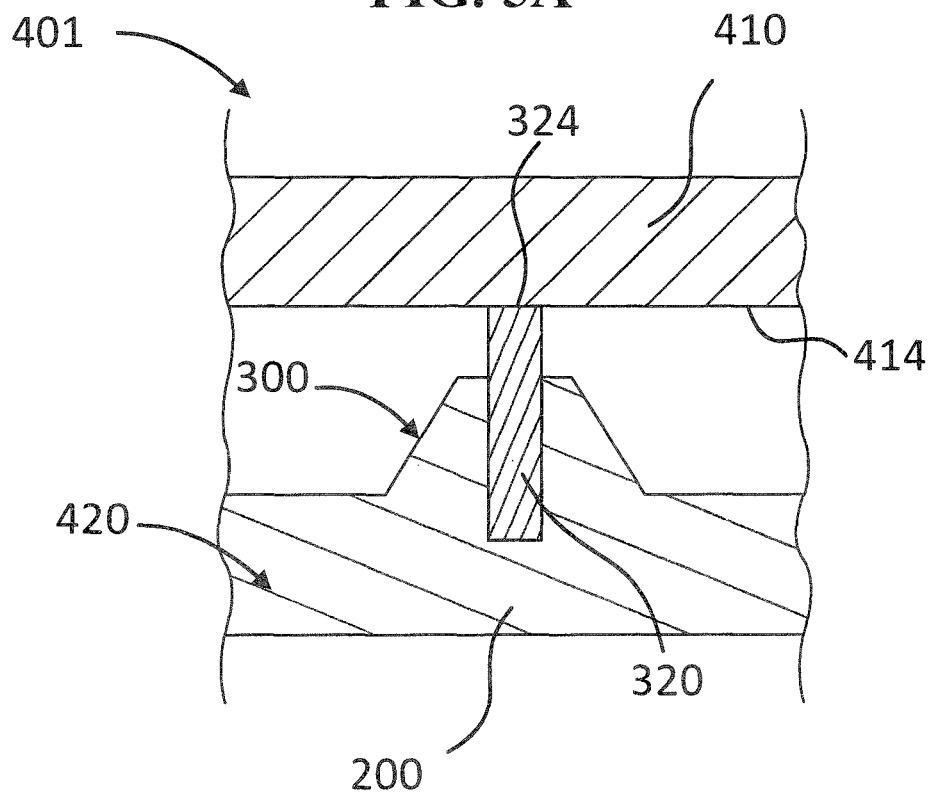
FIG. 5B illustrates a cross-sectional view of a casting assembly after wax removal and prior to casting, in accordance with various embodiments.

In various embodiments, with reference to FIG. 5B, after the wax 430 has been removed from the casting assembly, distal end 324 of pin 320 may abut external shell 410. During casting, a metal alloy is dispersed through the space between the inner surface 414 of external shell 410 and core assembly 420. The bumper assembly 300 may allow repeatable positioning on an airfoil 100 (from FIG. 2), since the pin 320 may merge into the finished casting of the airfoil 100 and/or may eliminate a hole through the airfoil 100 and/or between ribs of the airfoil 100.

Figure 6:
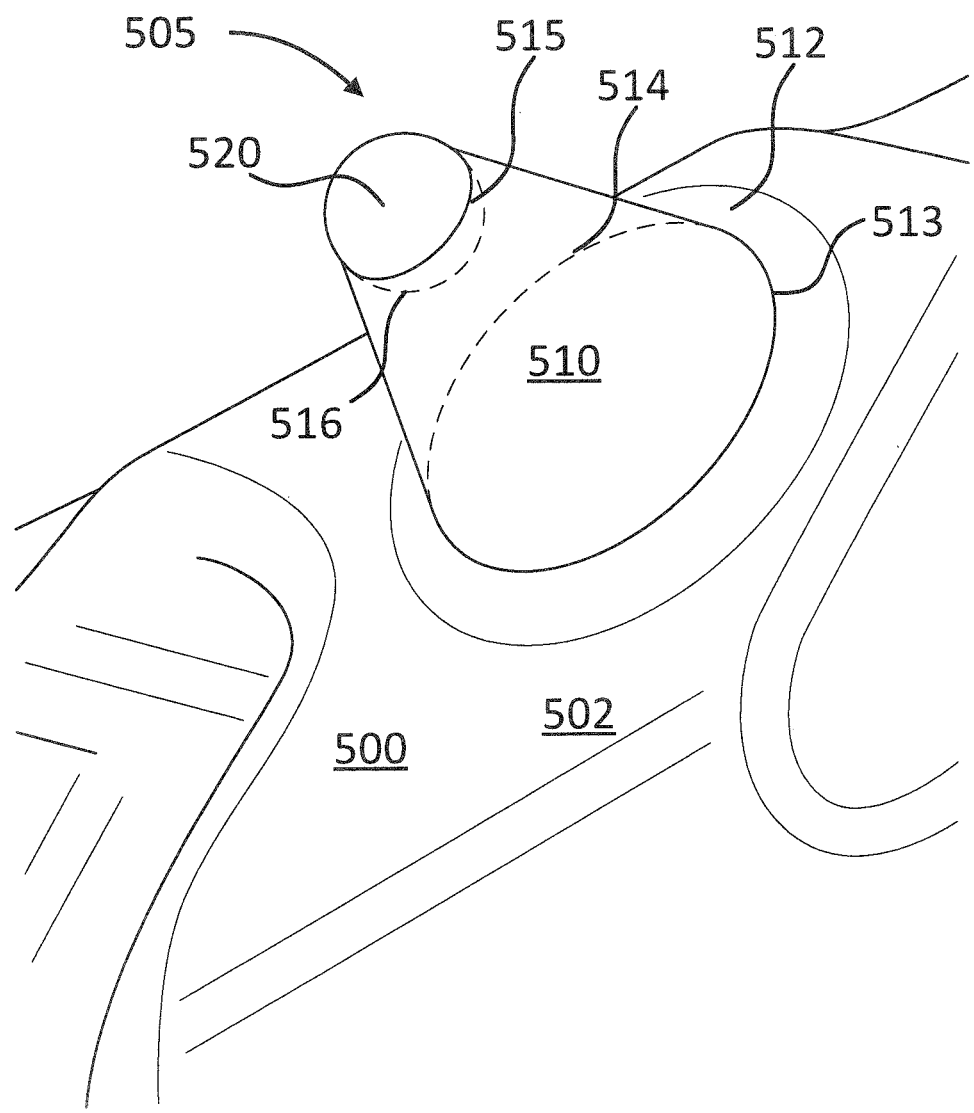
FIG. 6 illustrates a cast core including a bumper assembly, in accordance with various embodiments.

With reference to FIG. 6, a cast core 500 including a bumper assembly 505, in accordance with various embodiments, is illustrated. Cast core 500 comprises an outer surface 502 and a bumper assembly 505 extending outward from outer surface 502. In various embodiments, bumper assembly 505 is integral to the cast core 500. Bumper assembly 505 comprises a bumper 510 and a sphere 520. The sphere 520 may be disposed partially within the bumper 310. Although depicted as a sphere 520 in FIG. 6, and a pin 320 in FIGS. 4 and 5, any metallic apparatus partially disposed in a bumper of a cast core and protruding away from the bumper of the cast core is within the scope of this disclosure.

In various embodiments, the bumper 510 comprises a fillet 512 coupling a proximal edge 513 of bumper 510 to the outer surface 502 of the cast core 500. The fillet 512 may reduce stress concentrations during the casting process. In various embodiments, bumper 510 is a truncated cone 514 extending from proximal edge 513 to distal edge 515. The bumper 510 further comprises a receptacle 516 extending from distal edge 515 into the bumper 510. Receptacle 516 may be a recess and may comprise a semi-spherical shape. In various embodiments, the receptacle 516 may have a depth less than a height measured perpendicular to outer surface 502 from outer surface 502 to distal edge 515. In various embodiments, the bumper 510 is integral to the cast core 500. The bumper may be made from ceramic composite, or any other material known in the art. Similarly, the cast core may be made from ceramic composite, or any other material known in the art.

In various embodiments, the bumper 510 may comprise the receptacle 516. The sphere 520 may be inserted into the receptacle 516 and coupled via an adhesive or a mechanical lock. By integrating the sphere 520 into a bumper assembly 505 of a cast core 500, the manual process of inserting a pin into a wax pattern and blending the pin off post casting may be eliminated.

Figure 7A:
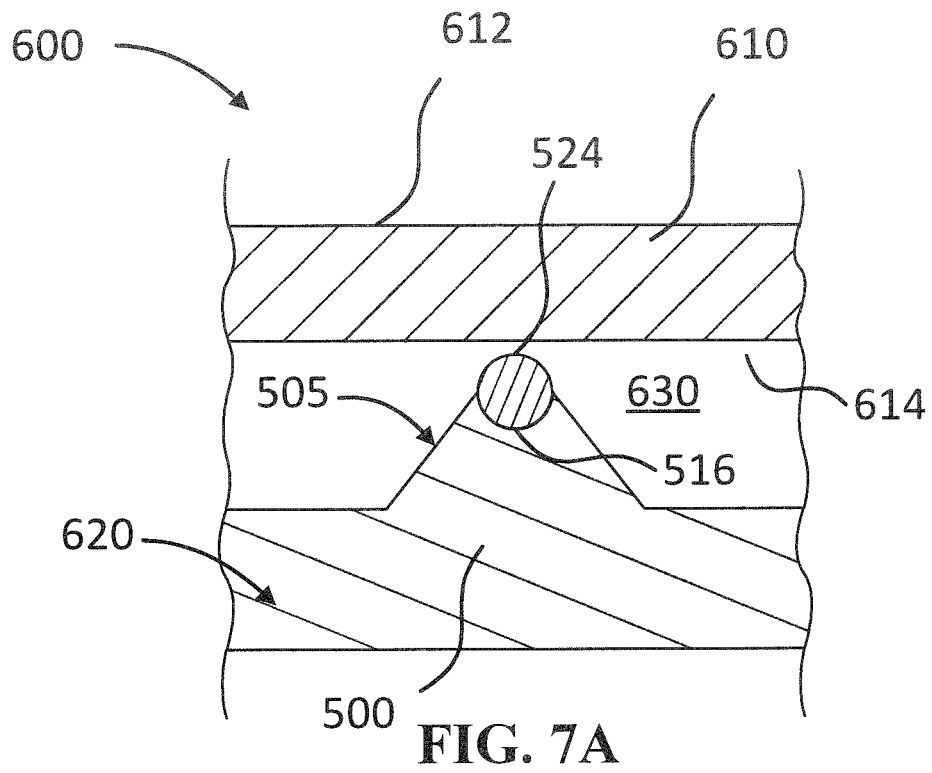
FIG. 7A illustrates a cross-sectional view of a casting assembly prior to casting, in accordance with various embodiments.

With reference to FIG. 7A, a cross-sectional view of a casting assembly 600 prior to casting, in accordance with various embodiments, is illustrated. In various embodiments, the casting assembly 600 comprises an external shell 610, a core assembly 620, and a wax disposed between the core assembly 620 and the external shell 610. In various embodiments, external shell 610 comprises an outer surface 612 and an inner surface 614 disposed opposite the outer surface 612. In various embodiments, casting assembly 600 comprises a casting core 500 and a bumper assembly 505. In various embodiments, a distal end 524 of sphere 520 between 0.000 inches and 0.006 inches (0.000 cm and 0.015 cm) from inner surface 614 of external shell 610, or between 0.002 inches and 0.006 inches (0.005 cm and 0.015 cm), or between 0.003 inches and 0.005 inches (0.008 cm and 0.013 cm). In various embodiments, distal end 524 of sphere 520 contacts inner surface 614. In various embodiments, 25%-75% of a surface area of sphere 520 is disposed within receptacle 516 of bumper 510, or between 35% and 65% of the surface area, or between 40% and 60% of the surface area.

Figure 7B:
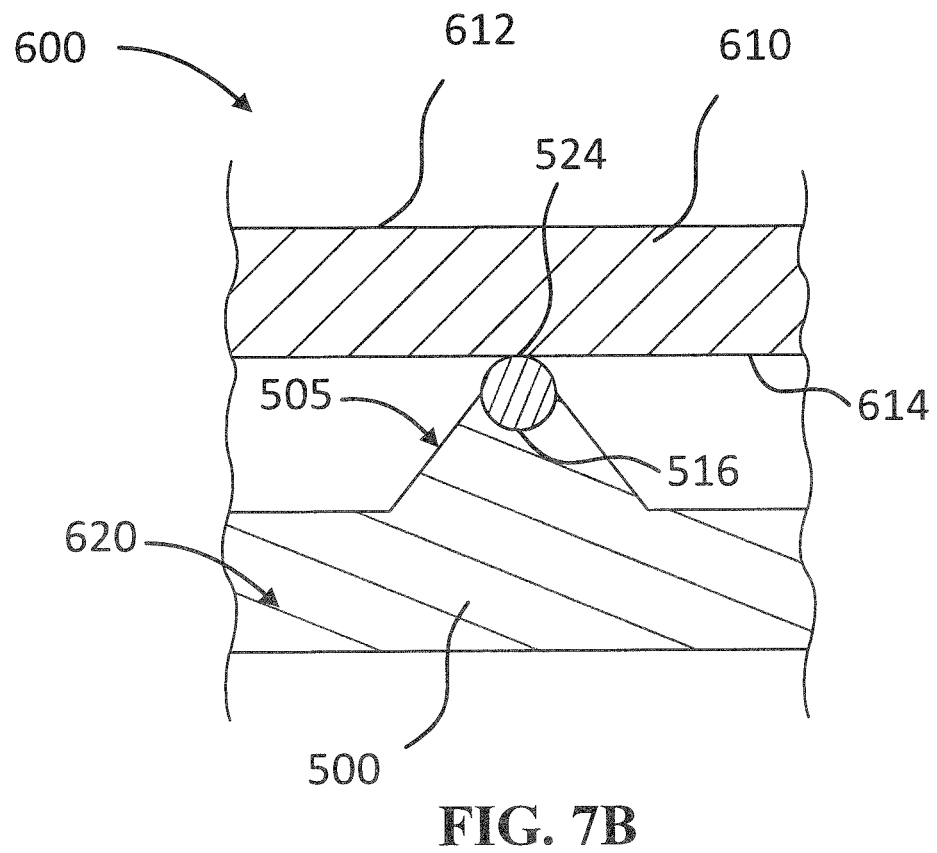
FIG. 7B illustrates a cross-sectional view of a casting assembly after wax removal and prior to casting, in accordance with various embodiments.

In various embodiments, the external shell 610 is made of ceramic composite, or any other material known in the art. In various embodiments, the core assembly 620 is manufactured. Then, the core assembly 620 is placed into a wax die. Wax 630 is then injected around the core assembly 620. The external pattern of airfoil 100 (from FIG. 2) is produced by the injected wax 630. The mold assembly comprising the core assembly 620 and the wax 630 is then placed on a tree assembly. The tree assembly is then dipped into ceramic to make external shell 610 outside of the wax 630 and resulting in casting assembly 600. Next, the casting assembly 600 is heated and the wax 630 is melted and removed from the casting assembly 600 resulting in casting assembly 601, as shown in FIG. 7B.

In various embodiments, with reference to FIG. 5B, after the wax 630 has been removed from the casting assembly, distal end 524 of sphere 520 may abut external shell 610. During casting, a metal alloy is dispersed through the space between the inner surface 614 of external shell 610 and core assembly 620. The bumper assembly 505 may allow repeatable positioning on an airfoil 100 (from FIG. 2), since the sphere 520 may merge into a finished casting of the airfoil 100 and/or may eliminate a hole through the airfoil 100 and/or between ribs of the airfoil 100.

Figure 8:
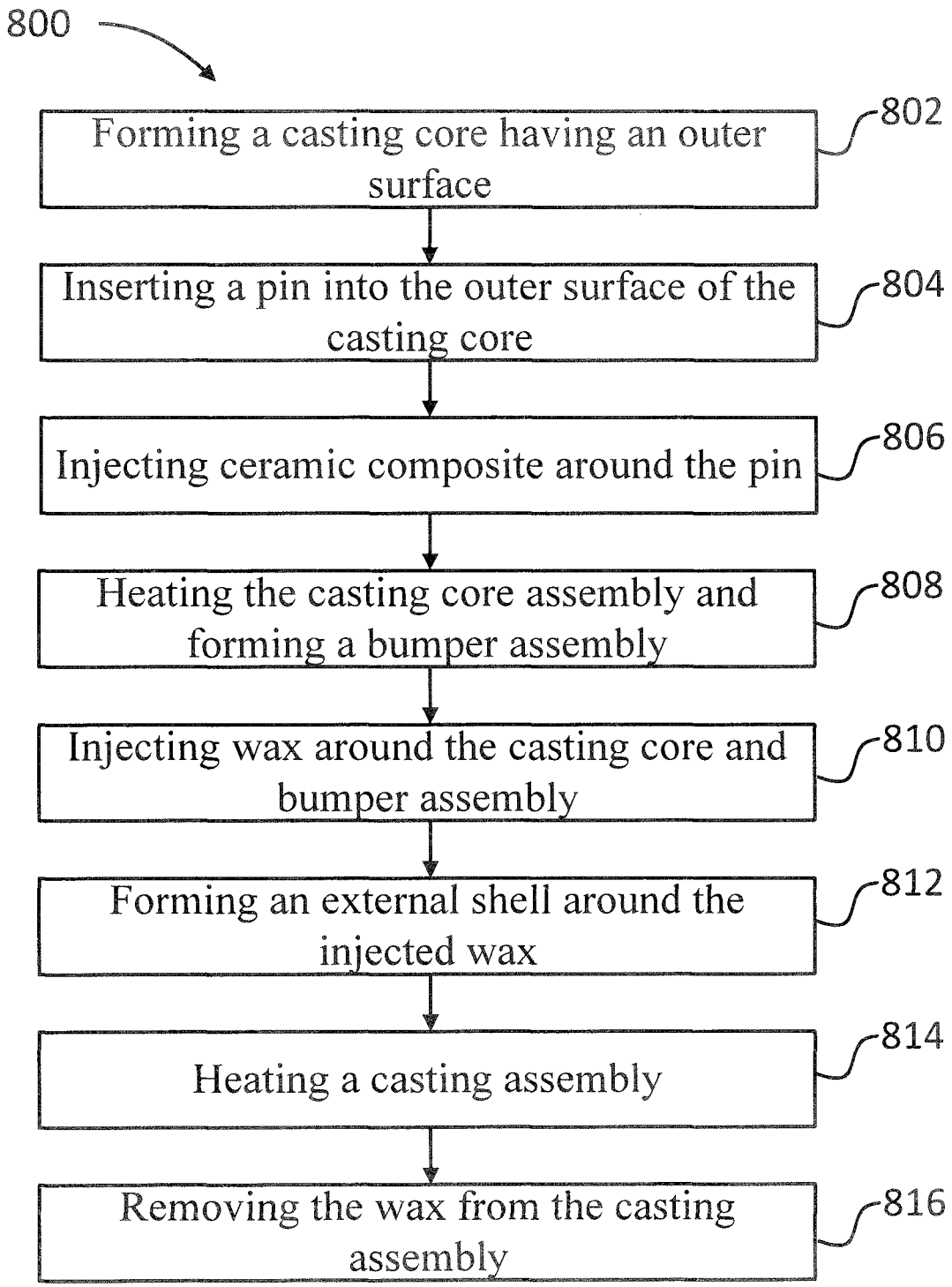
FIG. 8 illustrates a method of manufacturing a cast core assembly, in accordance with various embodiments.

With reference now to FIG. 8, a method of manufacturing a casting core assembly, in accordance with various embodiments, is illustrated. The method comprises forming a casting core having an outer surface (step 802). The casting core may be made of a ceramic matrix, or any other material known in the art. Next, a pin may be inserted into the outer surface of the casting core (step 804). A ceramic composite may be injected around the pin and form a bumper assembly on the outer surface of the casting core (step 806). In various embodiments, the casting core assembly may be as illustrated in FIGS. 4 and 5. Next, the casting core assembly may be heated forming a solid casting core assembly that couples the pin to the casting core assembly (step 808). Then, the casting core assembly may be placed in a wax die and wax may be injected around the casting core assembly (step 810). In various embodiments, the wax may enclose the bumper assembly within it.

In various embodiments, the method may further comprise forming an external shell around the injected wax (step 812). Forming the external shell may be done by placing the casting core assembly and wax on a mold with a tree assembly and dipping the casting core assembly and wax into a ceramic matrix slurry. The ceramic matrix slurry may be heated to harden the external shell resulting in a casting assembly as illustrated in FIG. 5A. In various embodiments, the method further comprises heating the casting assembly (step 814). Next, the wax may be removed as it becomes liquified during step 814 (step 816). In various embodiments, the casting assembly from FIG. 5B may be produced by step 816.

Figure 9:
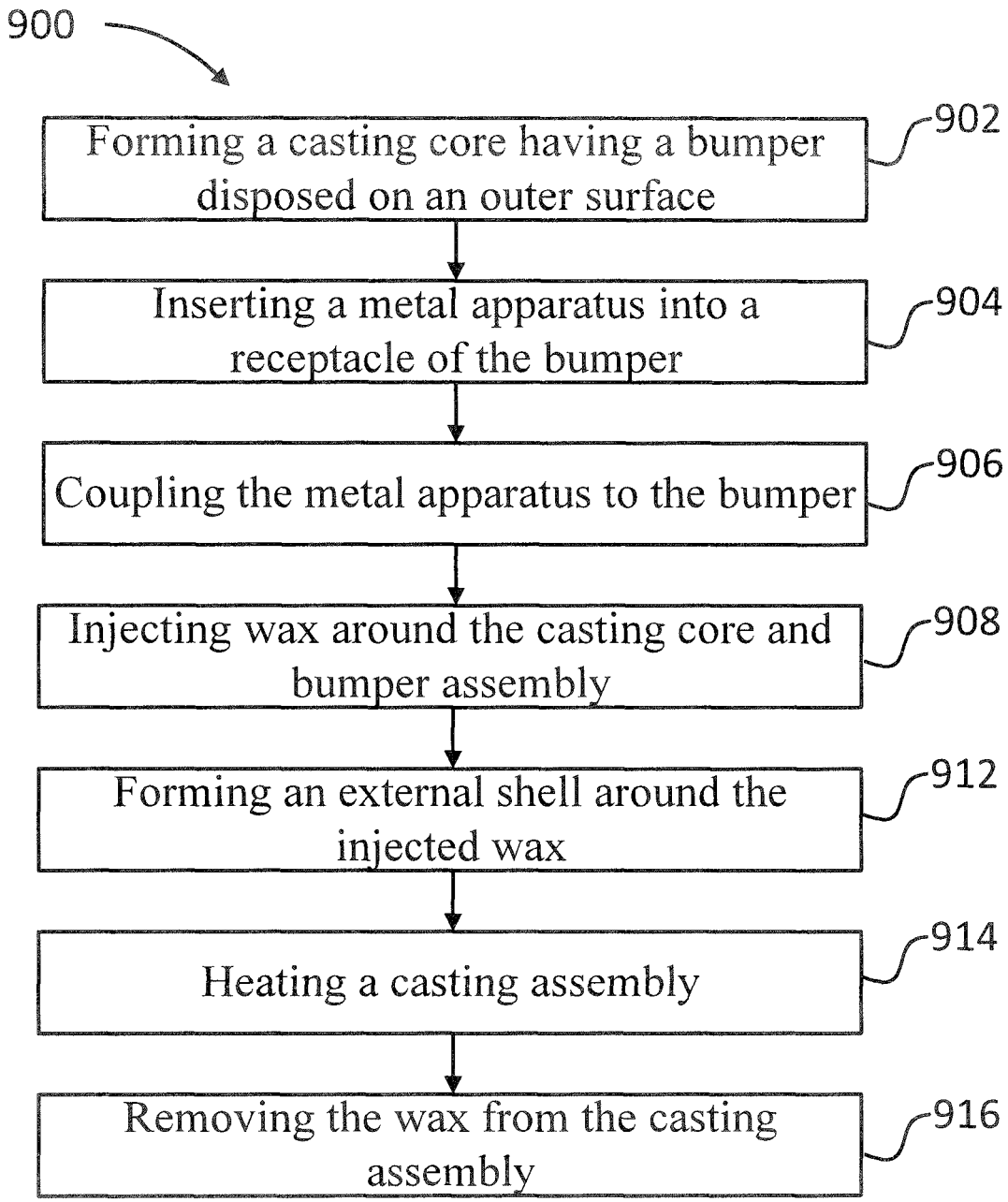
FIG. 9 illustrates a method of manufacturing a cast core assembly, in accordance with various embodiments.

With reference now to FIG. 9, a method of manufacturing a casting core assembly, in accordance with various embodiments, is illustrated. The method comprises forming a casting core having a bumper disposed on an outer surface (step 902). In various embodiments, the bumper may be in accordance with FIGS. 4-7B. The bumper may comprise a truncated cone and a receptacle disposed at an outer surface of the truncated cone. The casting core and bumper may be made of a ceramic matrix, or any other material known in the art. The method further comprises inserting a metal apparatus into the receptacle of the bumper (step 904). The metal apparatus may be a pin, a sphere, or any other metal apparatus known in the art. In various embodiments, the metal apparatus is made of platinum. The method may further comprise coupling the metal apparatus to the bumper (step 906). The metal apparatus may be coupled to the bumper by an adhesive and/or a mechanical lock. After the metal apparatus is coupled to the bumper a casting core assembly, as illustrated in FIGS. 4-7B may be formed. The method further comprises injecting wax around the casting core and bumper assembly (step 908). This may be done by placing the casting core assembly in a wax die injecting the wax around the casting core assembly. In various embodiments, the wax may enclose the bumper assembly within it.

In various embodiments, the method may further comprise forming an external shell around the injected wax (step 912). Forming the external shell may be done by placing the casting core assembly and wax on a mold with a tree assembly and dipping the casting core assembly and wax into a ceramic matrix slurry. The ceramic matrix slurry may be heated to harden the external shell resulting in a casting assembly as illustrated in FIG. 5A of FIG. 7A. In various embodiments, the method further comprises heating the casting assembly (step 914). Next, the wax may be removed as it becomes liquified during step 914 (step 916). In various embodiments, the casting assembly from FIG. 5B may be produced by step 916.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a casting assembly, the method comprising:
    forming a casting core having an outer surface;
    inserting a pin into the outer surface of the casting core to a depth below the outer surface; subsequently
    injecting a ceramic composite only around the pin above the outer surface to form a bumper that extends outward from the outer surface and to couple the pin to the casting core, the pin partially extending outward from the bumper;
    heating the casting core, the ceramic composite, and the pin to form a casting core assembly including a bumper assembly;
    injecting a wax around the casting core and the bumper assembly;
    forming an external shell around the wax; and
    heating the casting assembly and removing the wax from the casting assembly.

2. The method of claim 1, wherein the wax encloses the bumper assembly.

3. The method of claim 1, wherein the forming the external shell further comprises dipping the wax into a ceramic matrix slurry.

4. The method of claim 1, wherein the pin is spaced apart from the external shell in response to forming the external shell around the wax.

5. The method of claim 4, wherein an inner surface of the external shell abuts the pin in response to heating the casting assembly and removing the wax from the casting assembly.

* * * * *